(12) United States Patent
Uchikawa

(10) Patent No.: US 9,092,179 B2
(45) Date of Patent: Jul. 28, 2015

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Shinichi Uchikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/206,977

(22) Filed: Mar. 12, 2014

(65) Prior Publication Data
US 2014/0268232 A1   Sep. 18, 2014

(30) Foreign Application Priority Data
Mar. 14, 2013   (JP) ................................. 2013-051619

(51) Int. Cl.
*G06F 3/12*   (2006.01)
(52) U.S. Cl.
CPC ............ *G06F 3/1292* (2013.01); *G06F 3/1209* (2013.01); *G06F 3/1226* (2013.01)

(58) Field of Classification Search
USPC ......... 358/1.15, 1.9, 1.13, 442, 468; 713/300; 709/227, 203, 217
See application file for complete search history.

(56) References Cited

U.S. PATENT DOCUMENTS

| 6,922,725 B2 * | 7/2005 | Lamming et al. ............. 709/227 |
| 7,634,670 B2 * | 12/2009 | Nago et al. .................... 713/300 |
| 2007/0264991 A1 * | 11/2007 | Jones et al. .................... 455/420 |
| 2009/0207445 A1 * | 8/2009 | Kimura ........................ 358/1.15 |
| 2011/0279854 A1 * | 11/2011 | Ido .............................. 358/1.15 |
| 2014/0068058 A1 * | 3/2014 | Wolf ............................ 709/224 |

FOREIGN PATENT DOCUMENTS

JP   2012-199884 A   10/2012

* cited by examiner

*Primary Examiner* — Allen H Nguyen
(74) *Attorney, Agent, or Firm* — Canon U.S.A., Inc. IP Division

(57) ABSTRACT

A communication apparatus allows a user to set whether each of a plurality of services provided by the communication apparatus is or is not to be provided to an external device while the external device is connected with the communication apparatus via wireless communication.

22 Claims, 13 Drawing Sheets

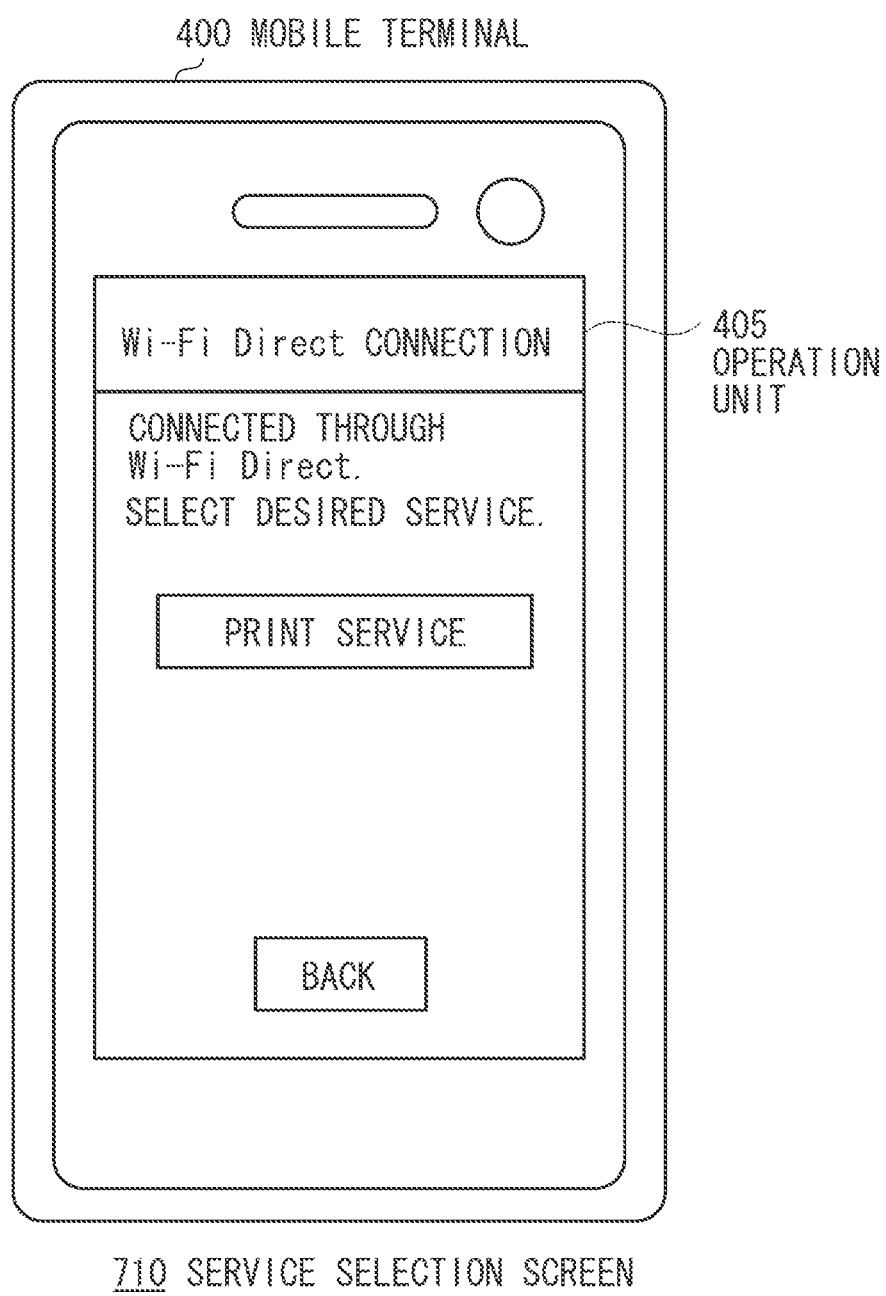

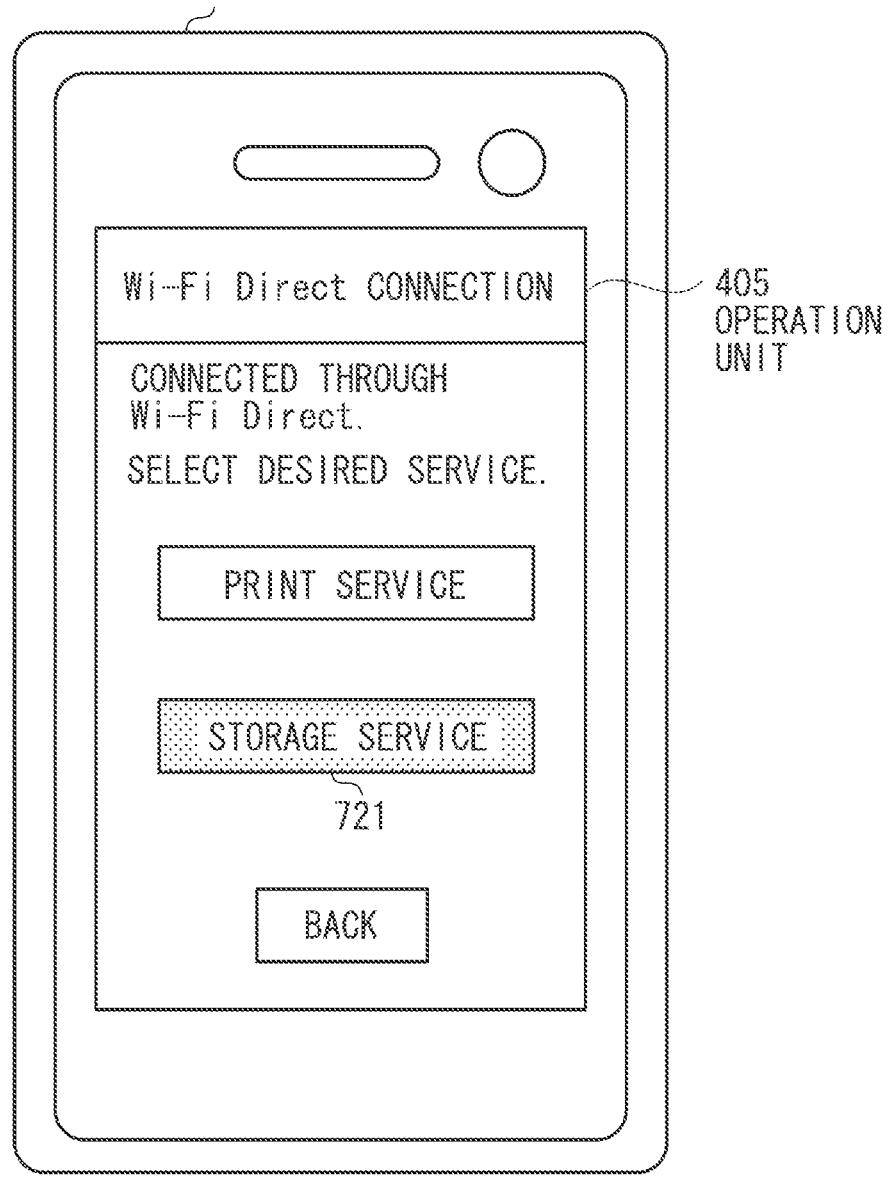

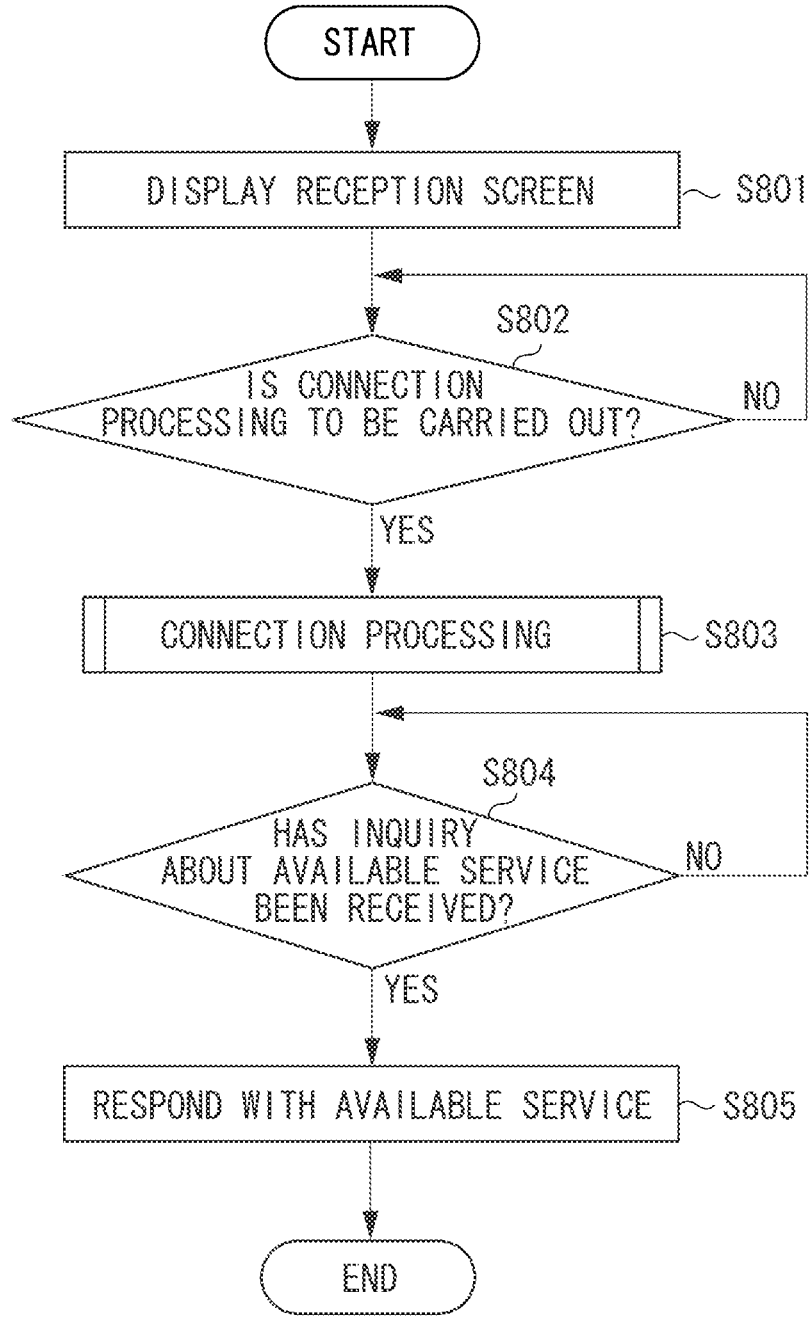

900 RECEPTION SCREEN

910 RECEPTION SCREEN

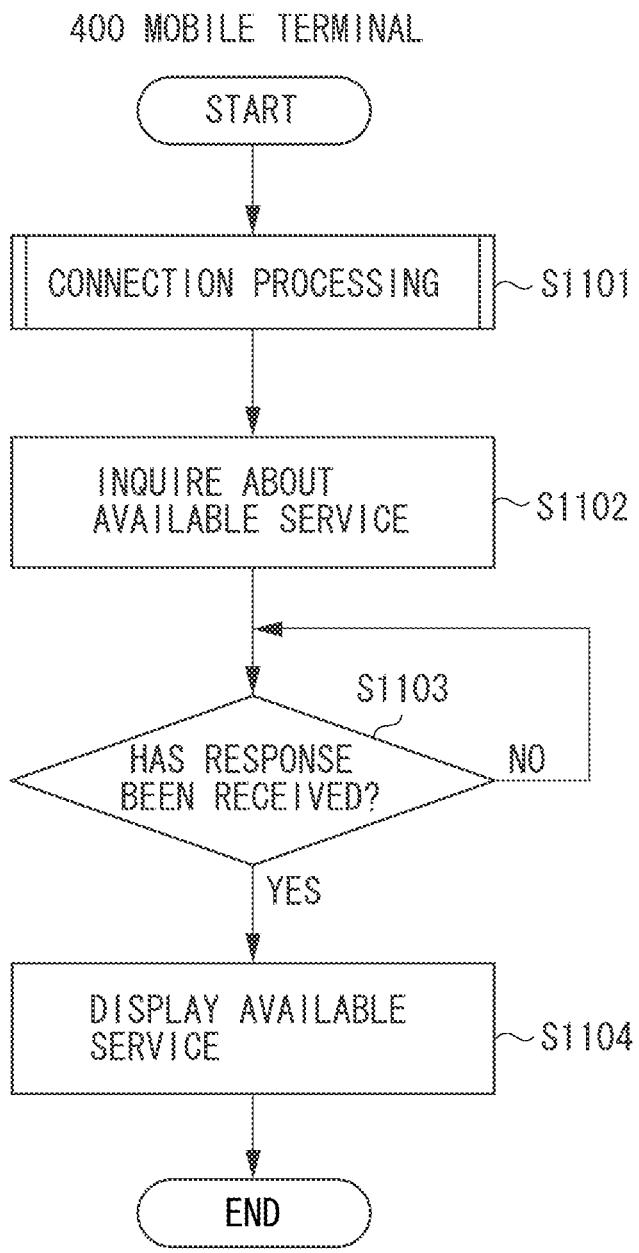

COMMUNICATION APPARATUS, METHOD FOR CONTROLLING COMMUNICATION APPARATUS, AND STORAGE MEDIUM

BACKGROUND

1. Field

Aspects of the present disclosure generally relate to a communication apparatus, a method for controlling the communication apparatus, and a storage medium.

2. Description of the Related Art

Wi-Fi Alliance has established a standard called the Wi-Fi Direct®). The Wi-Fi Direct® defines a protocol for determining whether a communication apparatus such as a printing apparatus and a personal computer (PC) operates as an access point or as a client. Executing this protocol makes it possible to automatically determine which communication apparatus operates as an access point and which communication apparatus operates as a client. The use of the Wi-Fi Direct® eliminates the need for preparing an access point separately and enables communication apparatuses to directly communicate with each other wirelessly.

FIG. 1 schematically illustrates a processing sequence in the Wi-Fi Direct®. A printing apparatus and a mobile terminal are examples of an information processing apparatus that supports the Wi-Fi Direct®.

In step S101, each of the printing apparatus and the mobile terminal carries out an apparatus search to identify a communication partner. Upon identifying a communication partner through the apparatus search, in step S102, the printing apparatus and the mobile terminal determine which one of the printing apparatus and the mobile terminal operates as an access point (Group Owner) and which one of the two operates as a Client. This processing in step S102 will be referred to as role determination. In FIG. 1, as a result of the role determination in step S102, the printing apparatus operates as a Group Owner, and the mobile terminal operates as a Client.

In step S103, the printing apparatus serving as a Group Owner provides, by using Wi-Fi Protected Setup (WPS) defined by Wi-Fi Alliance, the mobile terminal serving as a Client with a parameter for establishing a connection therebetween, and thus the printing apparatus and the mobile terminal share the parameter. In step S104, the printing apparatus and the mobile terminal establish a secure connection therebetween by using the parameter. Data link layer communication of the Open Systems Interconnection (OSI) reference model is being carried out until the processing in step S104 is completed.

Upon the secure connection having been established, in step S105, the printing apparatus and the mobile terminal carry out addressing for establishing Internet Protocol (IP) communication therebetween. Here, the printing apparatus serving as a Group Owner operates as a dynamic host configuration protocol (DHCP) server and provides an IP address to the mobile terminal serving as a Client. Communication of a layer higher than a network layer of the OSI reference model is available in the processing to be carried out after step S105.

Through the processing described above, wireless communication is established between the printing apparatus and the mobile terminal. The use of this wireless communication then enables the printing apparatus and the mobile terminal to directly communicate with each other without a separately prepared access point. Japanese Patent Application Laid-Open No. 2012-199884 discusses a technique for transmitting and receiving audio data and photographic data by using the Wi-Fi Direct®.

A communication apparatus can easily establish wireless communication with an external device via the Wi-Fi Direct®. By using the wireless communication established via the Wi-Fi Direct®, the communication apparatus can then use various services which the external device provides (e.g., a print service and a storage service).

Depending on an environment in which the Wi-Fi Direct® is used, however, there may be a case where a specific service is not to be provided. For example, in the case of a printing apparatus, there may be a case where the use of a print service via the Wi-Fi Direct® should be prohibited in order to limit the use of a print function to a case where a print job is submitted from a PC by using a wired local area network (LAN). Japanese Patent Application Laid-Open No. 2012-199884 discusses a technique for transmitting and receiving audio data and photographic data by using the Wi-Fi Direct®, but prohibiting the use of these functions is not taken into consideration.

SUMMARY

Aspects of the present disclosure are generally directed to a communication apparatus capable of setting, among a plurality of services, a service to be provided to an external device.

According to an aspect of the present disclosure, a communication apparatus capable of providing a plurality of services to an external device includes a setting unit configured to set, based on a specification by a user, whether to provide a service to an external device, a display unit configured to display a reception screen for receiving an execution instruction from the user for carrying out connection processing to establish wireless communication between the external device and the communication apparatus, and a connection unit configured to carry out the connection processing if the execution instruction is received from the user via the reception screen. In such a communication apparatus, the display unit displays the reception screen such that the user is able to differentiate between a service that is to be provided to the external device and a service that is not to be provided to the external device, based on a setting set by the setting unit.

Further features of the present disclosure will become apparent from the following description of exemplary embodiments with reference to the attached drawings.

BRIEF DESCRIPTION OF THE DRAWINGS

FIGS. 7A, 7B, and 7C each illustrate a screen to be displayed by the mobile terminal 400.

FIG. 8 is a flowchart illustrating processing to be carried out by the printing apparatus 200.

FIG. 11 is a flowchart illustrating processing to be carried out by the mobile terminal 400.

DESCRIPTION OF THE EMBODIMENTS

Various exemplary embodiments, features, and aspects are described in detail below with reference to the drawings. The following exemplary embodiment(s) is not intended to be limiting, and not all of combinations of features described herein are essential for solving the aforementioned issue.

Figure 2:
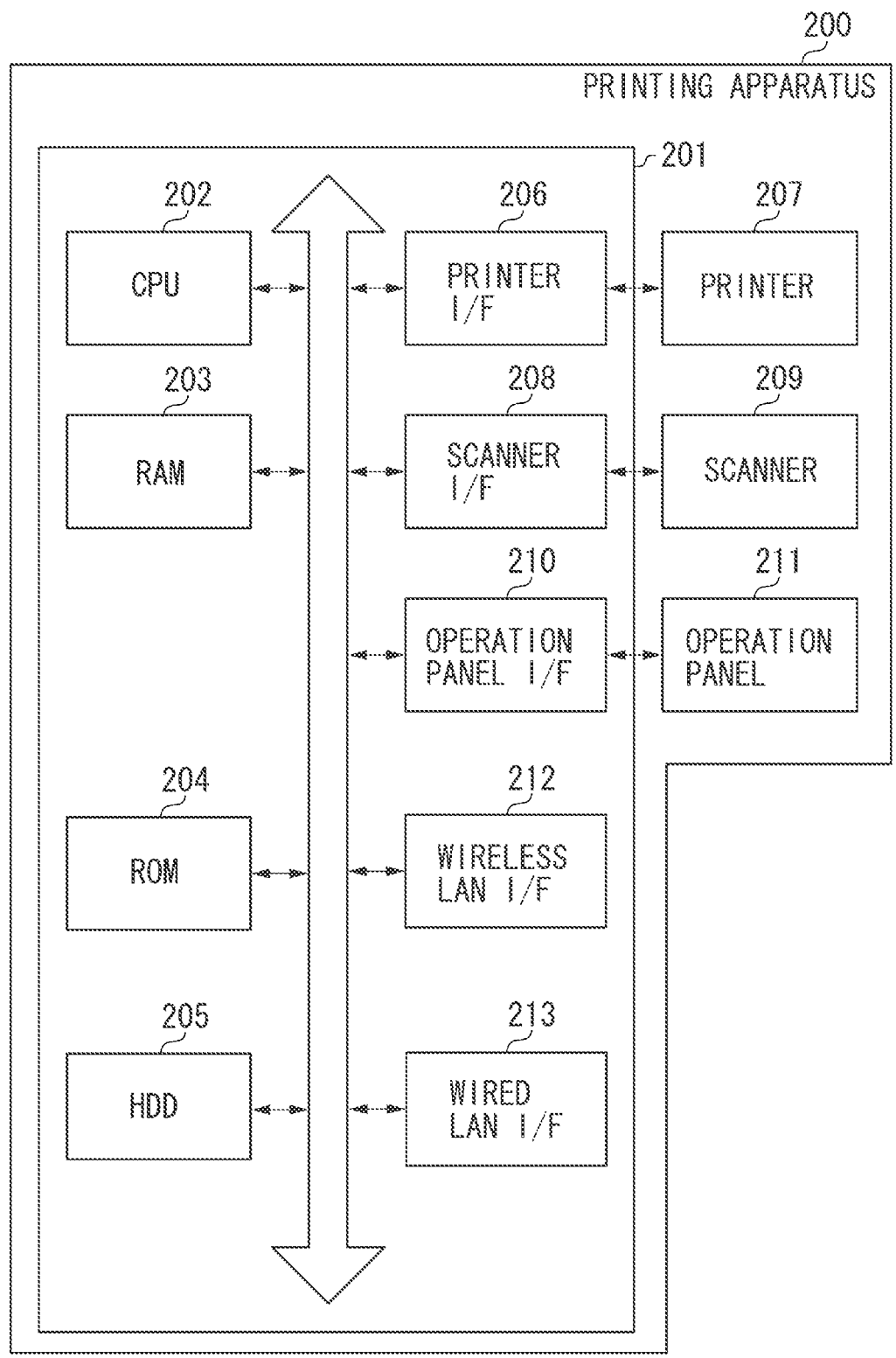
FIG. 2 illustrates a hardware configuration of a printing apparatus 200.

FIG. 2 illustrates a hardware configuration of a printing apparatus 200. The printing apparatus 200 is an example of a communication apparatus capable of executing wireless communication.

A control unit 201, which includes a central processing unit (CPU) 202, controls an overall operation of the printing apparatus 200. The CPU 202 reads a control program stored in a read-only memory (ROM) 204 to carry out various types of control such as communication control. A random access memory (RAM) 203 is used as a main memory or a temporary area such as a work area of the CPU 202. A hard disk drive (HDD) 205 stores data, various programs, or various information tables. In addition, the HDD 205 can store image data transmitted from an external device.

A printer interface (I/F) 206 connects a printer 207 (printer engine) with the control unit 201. The printer 207 carries out print processing on a sheet fed from a feed cassette (not illustrated), based on print data input via the printer I/F 206.

A scanner I/F 208 connects a scanner 209 with the control unit 201. The scanner 209 reads a document placed thereon to generate image data. The image data generated by the scanner 209 is then printed by the printer 207, stored in the HDD 205, or transmitted to an external device via a wireless LAN I/F 202 or a wired LAN I/F 213.

An operation panel I/F 210 connects an operation panel 211 with the control unit 201. The operation panel 211 includes a liquid crystal display unit provided with a touch panel function, a keyboard, various function keys, and so on. A user can check a screen displayed on the operation panel 211 or input various instructions to the printing apparatus 200 by using the touch panel.

The wireless LAN I/F 212 establishes wireless communication with an external device such as a mobile terminal and a PC. The printing apparatus 200 then receives print data from the external device via the established wireless communication, and the printer 207 carries out print processing based on the received print data. In addition, the printing apparatus 200 can transmit image data generated by the scanner 209 to an external device via the wireless LAN I/F 212.

A LAN cable (not illustrated) is connected to the wired LAN I/F 213, and the wired LAN I/F 213 can thus communicate with an external device (not illustrated).

The printing apparatus 200 is assumed to carry out each of the processes indicated in flowcharts described below with a single CPU 202 using a single memory (RAM 203). However, the present exemplary embodiment may take on a different mode. For example, a plurality of CPUs or a plurality of memories may cooperate to carry out each of the processes indicated in the below-described flowcharts.

Figure 3:
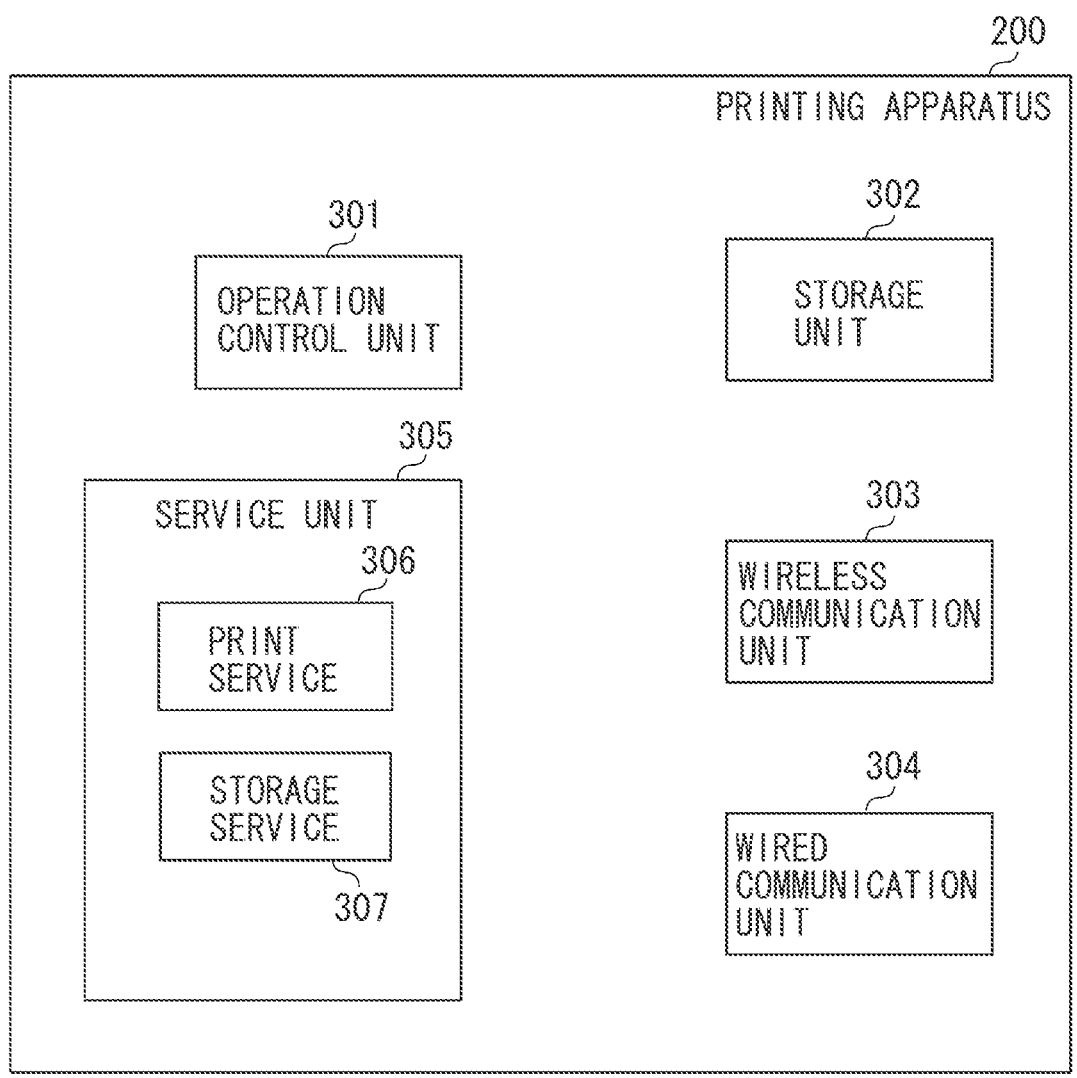
FIG. 3 illustrates a software configuration of the printing apparatus 200.

FIG. 3 illustrates a software configuration of the printing apparatus 200. Each of the functional units illustrated in FIG. 3 is realized as the CPU 202 executes a control program stored in the ROM 204 or the HDD 205.

An operation control unit 301 controls the operation panel 211. For example, the operation control unit 301 causes an operation screen to be displayed on the operation panel 211 or receives an instruction input from the user via the displayed operation screen. In addition, the operation control unit 301 notifies another functional unit of the received user instruction or updates the operation screen to be displayed in accordance with the received user instruction.

Based on an instruction from another functional unit, a storage unit 302 stores specified data in the RAM 203 or the HDD 205, or reads stored data.

A wireless communication unit 303 controls wireless communication to be established by the wireless LAN I/F 212. Meanwhile, a wired communication unit 304 controls communication to be established by the wired LAN I/F 213.

A service unit 305 provides a service to an external device such as a mobile terminal and a PC. In the present exemplary embodiment, the service unit 305 includes a print service 306 and a storage service 307. A service provided by the service unit 305 can be used by an external device (e.g., a mobile terminal 400) after a connection is established therebetween via the Wi-Fi Direct®.

The print service 306 provides a print service to an external device. Specifically, the print service 306 inputs, to the printer 207, print data received from the external device and causes the printer 207 to carry out print processing based on the print data.

The storage service 307 provides a storage service to an external device. Specifically, the storage service 307 stores, in a memory such as the HDD 205, an electronic file such as image data received from the external device.

Although the print service 306 and the storage service 307 are described as examples of the services to be provided by the service unit 305 in the present exemplary embodiment, the service unit 305 may be capable of providing a different service.

Figure 4:
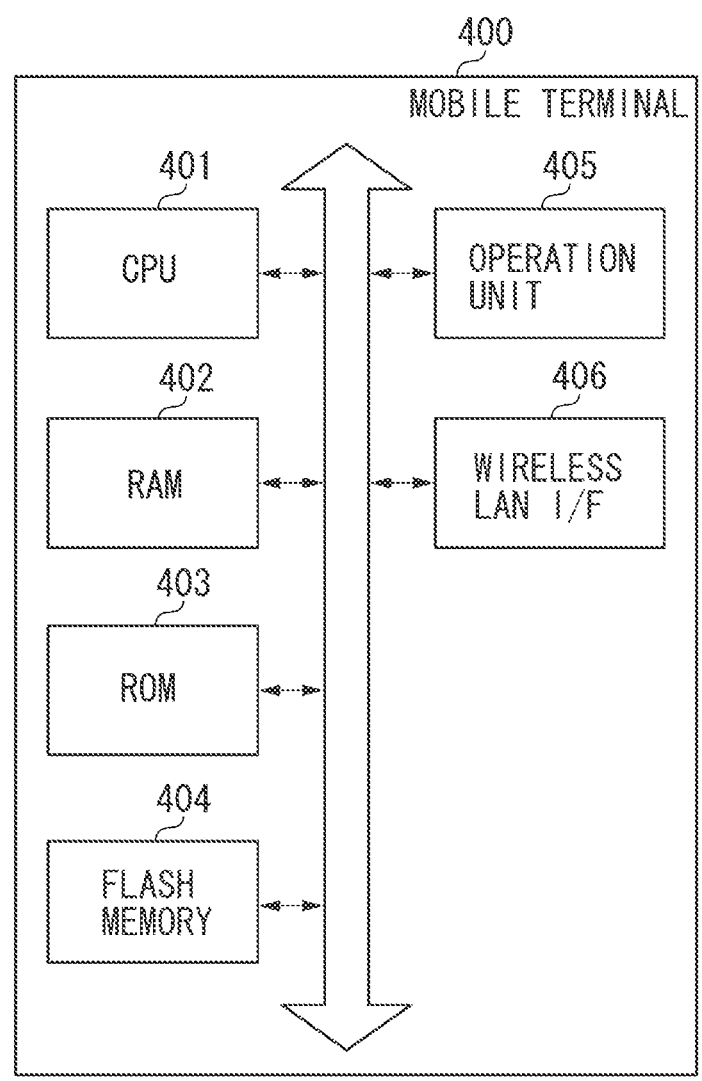
FIG. 4 illustrates a hardware configuration of a mobile terminal 400.

FIG. 4 illustrates a hardware configuration of a mobile terminal 400. As with the printing apparatus 200, the mobile terminal 400 is also an example of a communication apparatus capable of executing wireless communication. The mobile terminal 400 is, for example, a smartphone, a mobile phone, a tablet, a digital camera, or the like.

A CPU 401 reads a control program stored in a ROM 403 to control an overall operation of the mobile terminal 400. A RAM 402 is used as a main memory or a temporary area such as a work area of the CPU 401. A flash memory 404 is a non-volatile memory for storing data, various programs, or various information tables.

An operation unit 405 includes a liquid crystal display unit provided with a touch panel function, a hard key, and so on. The user can check a screen displayed on the operation unit 405 or input various instructions to the mobile terminal 400 by using the touch panel.

A wireless LAN I/F 406 establishes wireless communication with an external device such as the printing apparatus 200. The wireless LAN I/F 406 can, for example, transmit, to the printing apparatus 200, image data stored in a memory such as the flash memory 404 as print data.

The mobile terminal 400 is assumed to carry out each of the processes indicated in a flowchart described below with a single CPU 401 using a single memory (RAM 402). However, the present exemplary embodiment may take on a different mode. For example, a plurality of CPUs or a plurality of memories may cooperate to carry out each of the processes indicated in the below-described flowchart.

A flow of processing of the entire communication system according to the present exemplary embodiment will now be described with reference to a sequence diagram illustrated in FIG. 5. The communication system according to the present exemplary embodiment includes the mobile terminal 400 and the printing apparatus 200. The printing apparatus 200 includes the print service 306 and the storage service 307.

Figure 1:
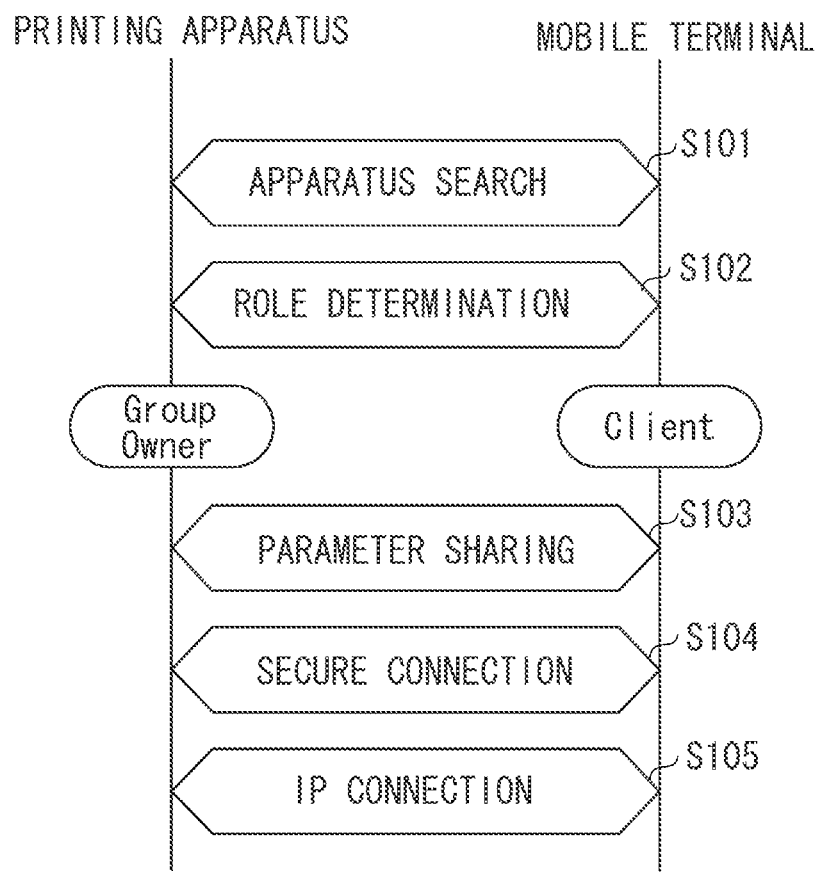
FIG. 1 illustrates a processing sequence in Wi-Fi Direct®.

In step S501, the mobile terminal 400 and the printing apparatus 200 carry out connection processing based on the Wi-Fi Direct®. The connection processing carried out in step S501 is similar to the processing described with reference to FIG. 1, and this connection processing enables the mobile terminal 400 and the printing apparatus 200 to establish a direct wireless communication therebetween.

In step S502, the mobile terminal 400 inquires of the printing apparatus 200 about an available service (i.e., a service to be provided by the printing apparatus 200). Upon receiving such an inquiry, in step S503, the printing apparatus 200 responds to the mobile terminal 400 with an available service (i.e., a service to be provided by the printing apparatus 200).

In the present exemplary embodiment, the printing apparatus 200 returns, in step S503, a response indicating not all the services included in the printing apparatus 200, namely not both of the print service 306 and the storage service 307. In the present exemplary embodiment, the user presets to the printing apparatus 200 which service is or is not to be provided to the external device. The printing apparatus 200 thus returns, in step S503, a service that has been set to be provided and does not return a service that has been set not to be provided.

Figure 6:
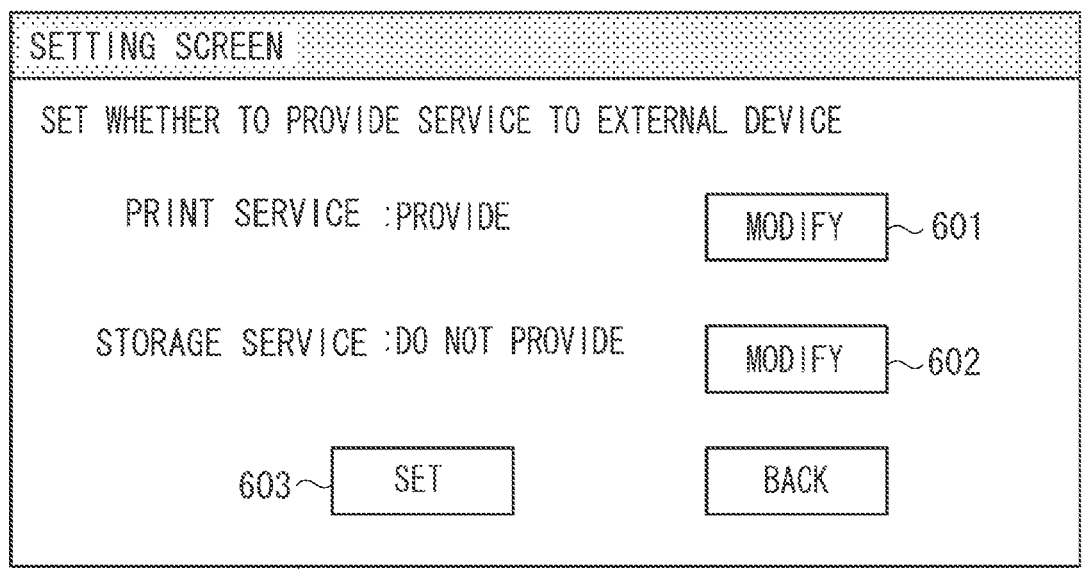
FIG. 6 illustrates a screen to be displayed by the printing apparatus 200.

A setting screen 600 illustrated in FIG. 6 allows the user to set whether each of the services to be provided by the printing apparatus 200 is to be provided to the external device, and is displayed on the operation panel 211 of the printing apparatus 200. Settings input via the setting screen 600 are applied when a service is used via the Wi-Fi Direct®. On the setting screen 600, the print service is set to be provided to the external device (i.e., the use of the service is permitted), and the storage service is set not to be provided to the external device (i.e., the use of the service is not permitted). The user can modify each of these settings by using icons 601 and 602, respectively. Upon the user pressing an icon 603 after making the settings as desired, the content set via the setting screen 600 is stored in a memory such as the HDD 205 by the storage unit 302.

It is assumed that any user can make the settings via the setting screen 600 in the present exemplary embodiment. However, a user authentication function may be incorporated into the printing apparatus 200 to thus allow only a specific user (e.g., a user authorized as an administrator) to make the settings via the setting screen 600.

Upon receiving a response in step S503, in step S504, the mobile terminal 400 displays a list of available services. A service selection screen 700 illustrated in FIG. 7A is an example of a screen displayed in step S504, and is displayed on the operation unit 405 of the mobile terminal 400.

Figure 7A:
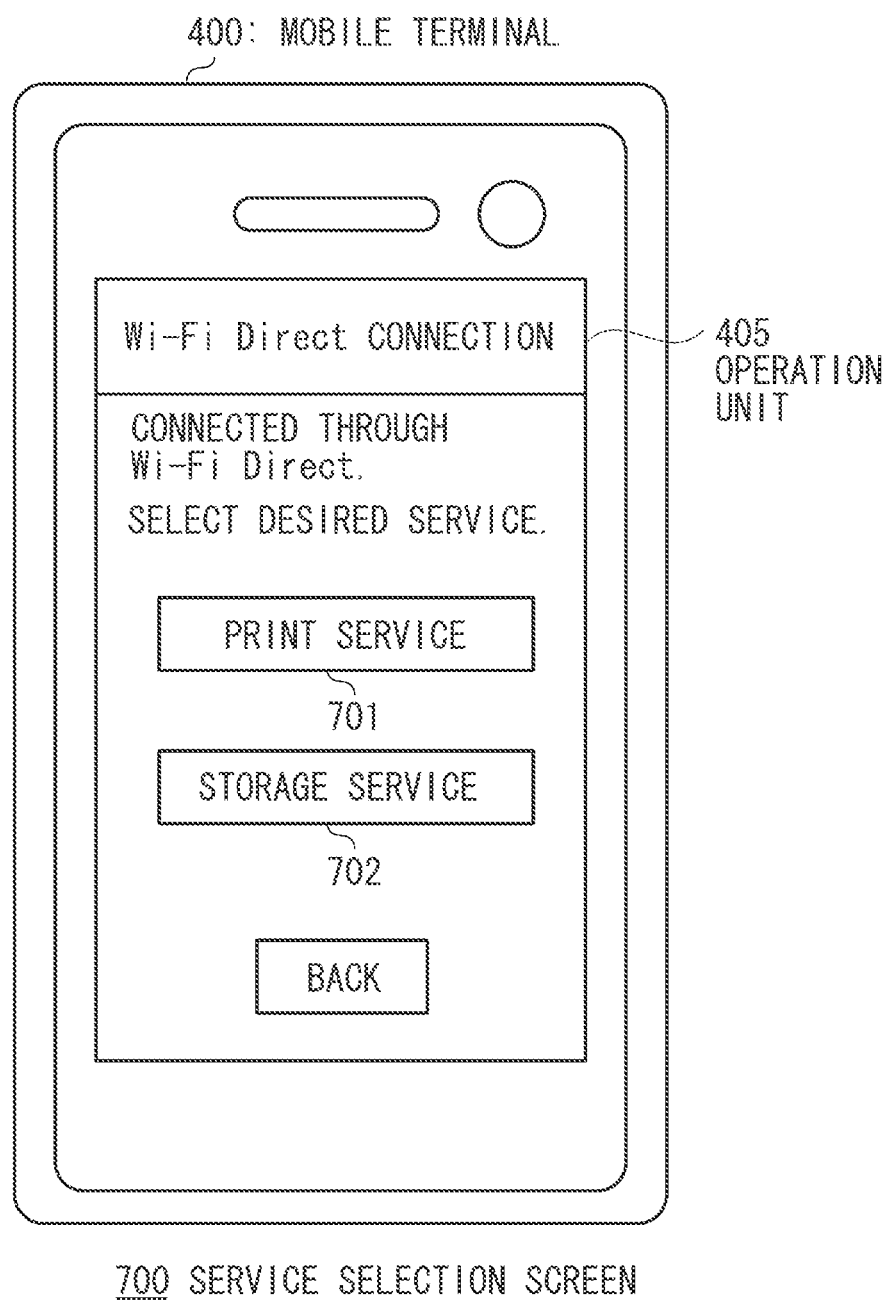

The service selection screen illustrated in FIG. 7A is displayed if the mobile terminal 400 receives, in step S503, a response indicating that the print service and the storage service are available. On the service selection screen 700, the user can select a desired one of the print service and the storage service by using icons 701 and 702, respectively.

Meanwhile, if the mobile terminal 400 receives, in step S503, a response indicating that only the print service is available, a service selection screen 710 illustrated in FIG. 7B is displayed on the operation unit 405 of the mobile terminal 400. Unlike the service selection screen 700, the storage service is not displayed on the service selection screen 710.

After the user selects a desired service via a screen displayed in step S504, in step S505, the user uses the selected service. If the user selects the print service, in step S505, the mobile terminal 400 transmits print data to the printing apparatus 200, and the printer 207 of the printing apparatus 200 then carries out printing based on the print data. Meanwhile, if the user selects the storage service, in step S505, the mobile terminal 400 transmits, to the printing apparatus 200, an electronic file selected by the user, and the printing apparatus 200 then stores the received electronic file in a predetermined storage area such as the HDD 205.

As described thus far, the printing apparatus 200 allows the user to set, via the setting screen 600, whether each of the services provided by the printing apparatus 200 is or is not to be provided to the external device. The external device (e.g., the mobile terminal 400) can then use only a service that is set to be provided to the external device while the external device is connected to the printing apparatus 200 via the Wi-Fi Direct®.

The printing apparatus 200 returns, in step S503, a response indicating only an available service in the preceding description. However, the printing apparatus 200 may return a response indicating an unavailable service in addition to the available service. Specifically, in step S503, the printing apparatus 200 may return a response indicating that the print service is available but the storage service is unavailable. In such a case, the mobile terminal 400 can recognize the presence of the storage service, and thus, in step S504, the mobile terminal 400 displays a service selection screen 720 illustrated in FIG. 7C. On the service selection screen 720, the storage service, which has been notified as being unavailable, is disabled (e.g., grayed out) as indicated by an icon 721 so that a user selection cannot be received.

Processing carried out by the printing apparatus 200 when establishing a Wi-Fi Direct® connection will now be described with reference to the flowchart illustrated in FIG. 8. Each of the steps indicated in the flowchart of FIG. 8 is implemented as the CPU 202 loads a program stored in a memory such as the ROM 204 onto the RAM 203 and executes the program. The assumption here is that the user presets to the printing apparatus 200 whether each of the services provided by the printing apparatus 200 is or is not to be provided to the external device via the setting screen 600 illustrated in FIG. 6.

In step S801, the operation panel 211 displays a reception screen. The reception screen displayed in step S801 serves to receive an execution instruction from the user for carrying out the connection processing based on the Wi-Fi Direct®. An example of the reception screen displayed in step S801 will now be described with reference to FIGS. 9A and 9B.

Figure 9A:
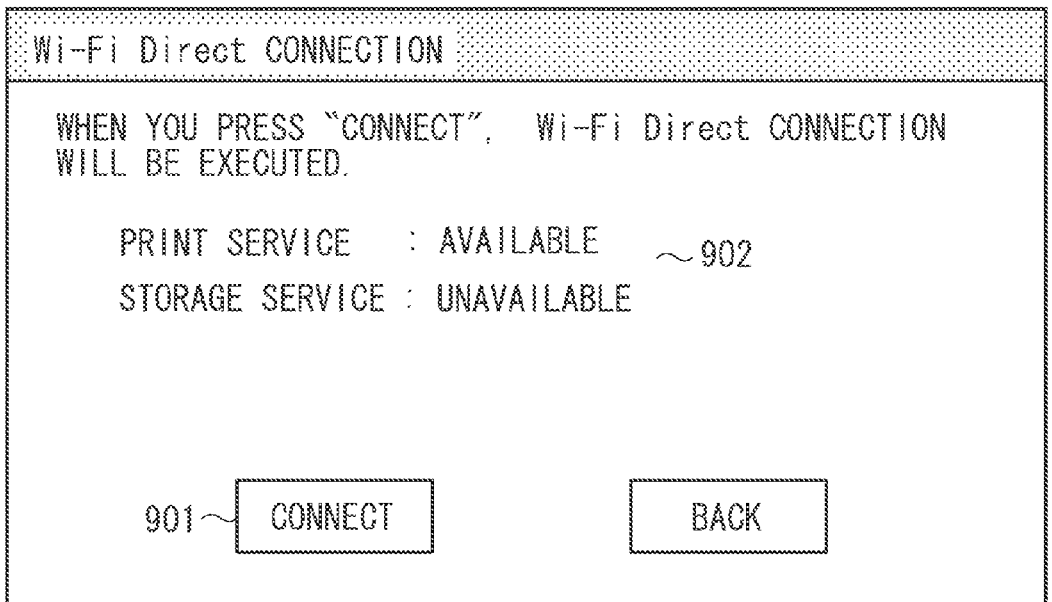
FIGS. 9A and 9B each illustrate a screen to be displayed by the printing apparatus 200.
Figure 9B:
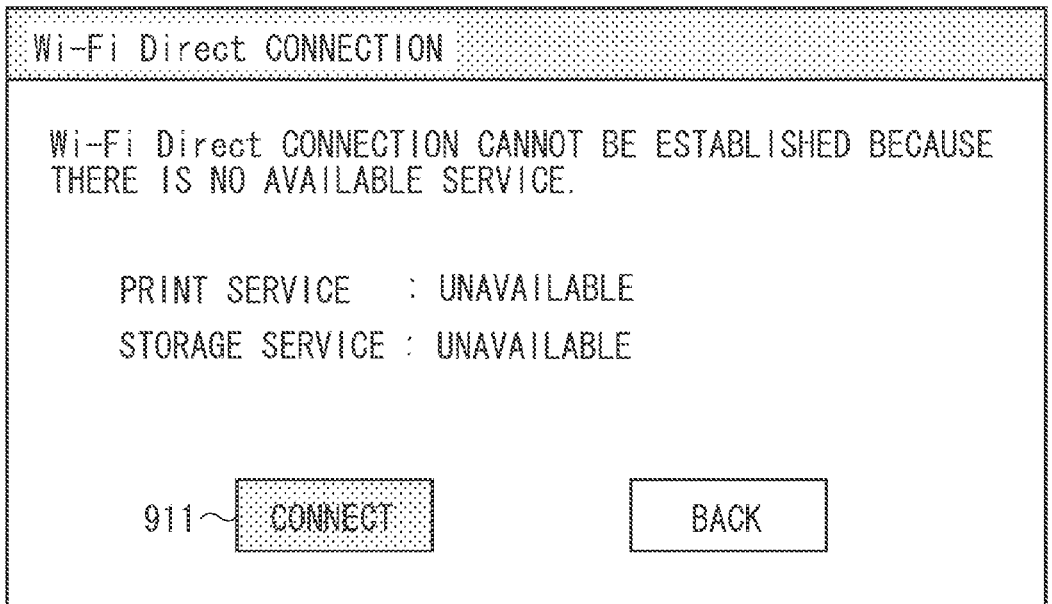

A reception screen 900 illustrated in FIG. 9A is an example of the reception screen displayed in step S801. The reception screen 900 is displayed if the user presets, via the setting screen 600, the print service "to be provided" to the external device and the storage service "not to be provided" to the external device. Upon the user selecting an icon 901, the connection processing based on the Wi-Fi Direct® is carried out. An available service and an unavailable service are both displayed on the reception screen 900. However, only an available service may be displayed with an unavailable service not being displayed.

In addition, in an area 902 of the reception screen 900, information indicating that the print service is available and the storage service is unavailable is displayed based on the settings via the setting screen 600. In the present exemplary embodiment, the user of the mobile terminal 400 instructs the connection processing to be carried out in both the printing apparatus 200 and the mobile terminal 400 to cause the connection processing to be carried out, and wireless communication is thus established between the printing apparatus 200 and the mobile terminal 400. In other words, a user who does not know the settings via the setting screen 600 may see the reception screen 900. However, even in such a case, the user can find out whether a desired service is available by checking the area 902. If the content in the area 902 is not displayed, the user finds out that a desired service (service that has been set as being unavailable) is not available when the user actually tries to use that service after wireless communication is established by carrying out the connection processing based on the Wi-Fi Direct®. The display of the area 902 allows the user to recognize whether a desired service is available at a timing prior to carrying out the connection processing, which can prevent unnecessary connection processing to be carried out.

The content displayed in the area 902 varies according to the settings via the setting screen 600. If the settings via the setting screen 600 indicate that the print service and the storage service can both be provided to the external device, the area 902 displays information indicating that the print service and the storage service are both available.

Meanwhile, if the settings via the setting screen 600 indicate that none of the services provided by the printing apparatus 200 are to be provided to the external device, the external device (e.g., the mobile terminal 400) cannot use any of the services even if wireless communication is established by carrying out the connection processing based on the Wi-Fi Direct®. Accordingly, there is no need to carry out the connection processing, and thus the operation panel 211 displays a reception screen 910 illustrated in FIG. 9B if none of the services are set to be provided to the external device. On the reception screen 910, an icon 911 is disabled (e.g., grayed out) so that a user operation cannot be received. Thus, the printing apparatus 200 is controlled so as not to carry out the connection processing. Such a configuration can prevent the user from instructing unnecessary connection processing to be carried out.

Referring back to the flowchart illustrated in FIG. 8, after the operation panel 211 displays the reception screen in step S801, in step S802, the CPU 202 determines whether to carry out the connection processing. If the CPU 202 receives an execution instruction from the user for carrying out the connection processing (i.e., if the user selects the icon 901), the CPU 202 determines, in step S802, that the connection processing is to be carried out (Yes in step S802), and the processing proceeds to step S803. Meanwhile, if the CPU 202 does not receive an execution instruction from the user for carrying out the connection processing (No in step S802), the CPU 202 waits until the CPU 202 receives such an instruction.

In step S803, the wireless LAN I/F 212 carries out the connection processing based on the Wi-Fi Direct®. The connection processing will be described below in detail with reference to FIG. 10. Wireless communication is established between the printing apparatus 200 and the external device (e.g., the mobile terminal 400) through the connection processing in step S803. The following description is based on the assumption that the wireless communication has been established between the printing apparatus 200 and the mobile terminal 400.

In step S804, the CPU 202 determines whether the CPU 202 has received an inquiry from the mobile terminal 400 about an available service. This inquiry corresponds to an inquiry which the mobile terminal 400 transmits in step S1103 of FIG. 11. If the CPU 202 determines that the CPU 202 has received an inquiry about an available service from the mobile terminal 400 (Yes in step S804), the processing proceeds to step S805. Meanwhile, if the CPU 202 determines that the CPU 202 has not received an inquiry about an available service from the mobile terminal 400 (No in step S804), the CPU 202 waits until the CPU 202 receives such an inquiry.

Figure 5:
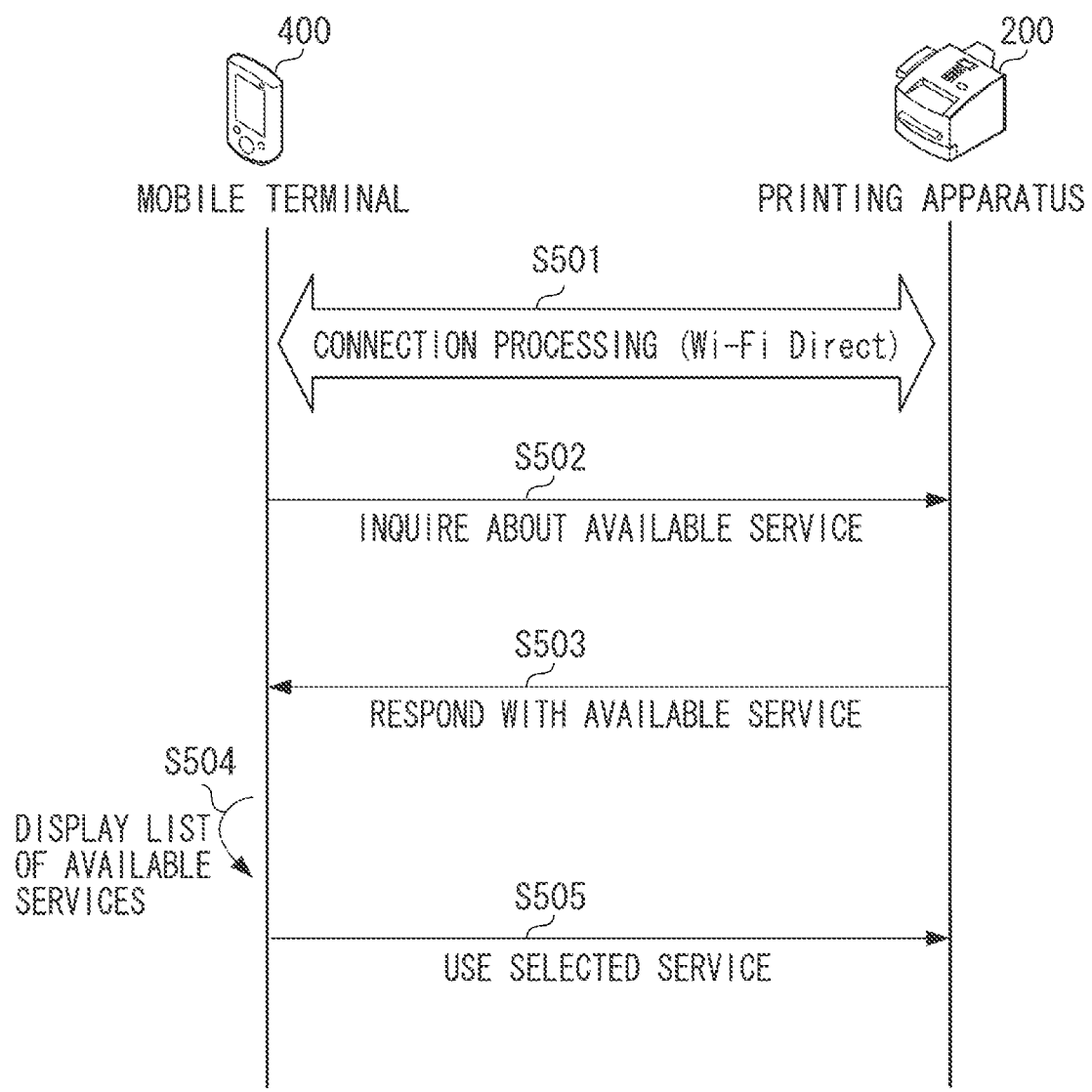
FIG. 5 is a sequence diagram illustrating an overall processing flow.

In step S805, the wireless LAN I/F 212 responds to the received inquiry with an available service (corresponding to step S503 of FIG. 5). This response is made based on the settings via the setting screen 600 illustrated in FIG. 6. In the present exemplary embodiment, a service that has been set to be provided to the external device via the setting screen 600 is returned as an available service in step S805, and a service that has been set not to be provided to the external device via the setting screen 600 is not returned in step S805.

Figure 10:
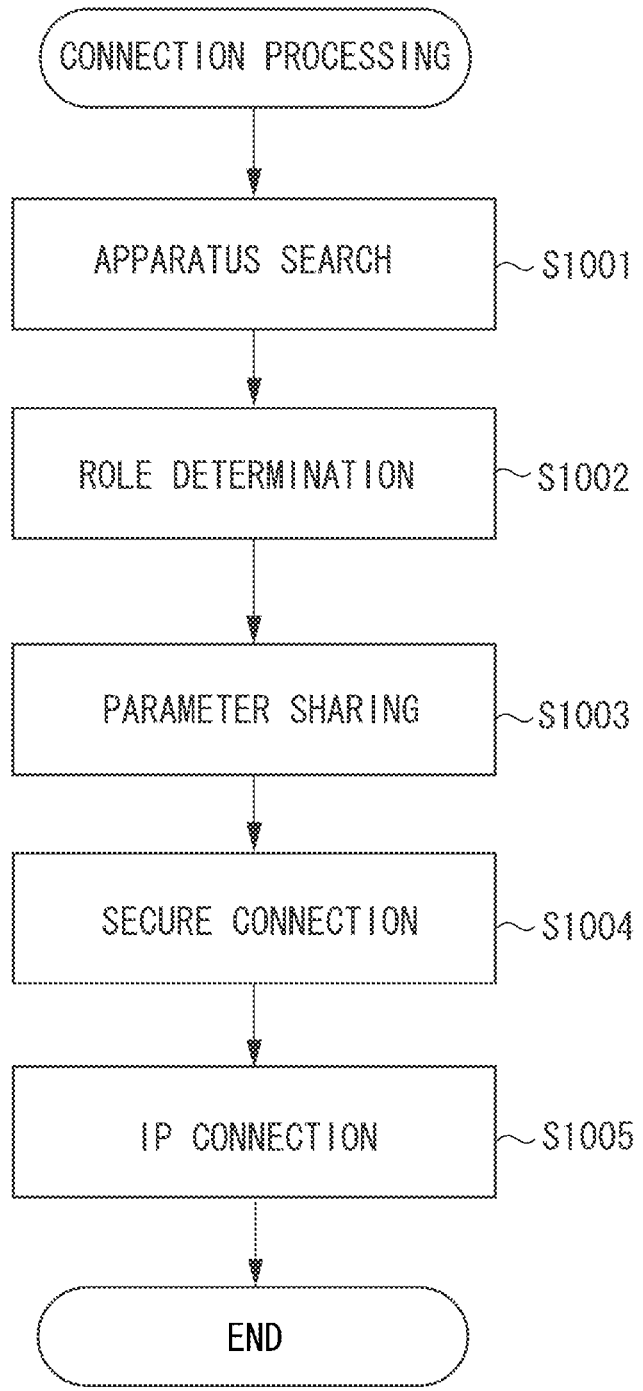
FIG. 10 is a flowchart illustrating connection processing.

The connection processing carried out in step S803 of FIG. 8 will now be described with reference to the flowchart illustrated in FIG. 10. Each of the steps indicated in the flowchart of FIG. 10 is implemented as the CPU 202 loads a program stored in a memory such as the ROM 204 onto the RAM 203 and executes the program.

In step S1001, the wireless LAN I/F 212 carries out an apparatus search. The apparatus search is processing for identifying a connection destination. In the present exemplary embodiment, the external device also carries out the apparatus search in response to a user operation. The external device that carries out the apparatus search is identified as a connection destination through the apparatus search in step S1001. The following description is based on the assumption that the mobile terminal 400 has been identified as a connection destination.

In step S1002, the wireless LAN I/F 212 determines which one of the mobile terminal 400 and the printing apparatus 200 serves as an access point (Group Owner) and which one of the two serves as a Client. This processing will be referred to as role determination.

In step S1003, the wireless LAN I/F 212 shares a parameter with the mobile terminal 400 by using the WPS. The parameter is thus shared between the mobile terminal 400 and the printing apparatus 200 through the processing in step S1003.

In step S1004, the wireless LAN I/F 212 establishes a secure connection by using the parameter that has been shared in step S1003. Data link layer communication of the OSI reference model is being carried out until the processing in step S1004 is completed.

In step S1005, the wireless LAN I/F 212 carries out an IP connection with the mobile terminal 400. In step S1005, the wireless LAN I/F 212 carries out addressing to carry out IP communication between the mobile terminal 400 and the printing apparatus 200. Here, an apparatus serving as a Group Owner provides an IP address to another apparatus serving as a Client. Wireless communication is thus established between the mobile terminal 400 and the printing apparatus 200 through the processing described with reference to FIG. 10. Communication of a layer higher than a network layer of the OSI reference model becomes possible in the processing to be carried out after step S1005 (steps S804 and S805 of FIG. 8).

Processing carried out by the mobile terminal 400 when carrying out a Wi-Fi Direct® connection will now be described with reference to the flowchart illustrated in FIG. 11. Each of the steps indicated in the flowchart of FIG. 11 is implemented as the CPU 401 loads a program stored in a memory such as the ROM 403 onto the RAM 402 and executes the program.

Upon receiving an execution instruction from the user for carrying out the connection processing, in step S1101, the wireless LAN I/F 406 carries out the connection processing based on the Wi-Fi Direct®. This connection processing is similar to the connection processing carried out by the printing apparatus 200 as described with reference to FIG. 10, and thus detailed descriptions thereof will be omitted. In the present exemplary embodiment, it is assumed that wireless communication has been established between the mobile terminal 400 and the printing apparatus 200 through the connection processing in step S1101.

Upon the connection processing in step S1101 being completed, in step S1102, the wireless LAN I/F 406 inquires of the printing apparatus 200 about an available service (corresponding to step S502 of FIG. 5). In the present exemplary embodiment, the inquiry made in step S1102 is processing carried out in response to the wireless communication being established through the connection processing in step S1101 and is carried out automatically without a user instruction. The processing in step S1102 is not limited to the above processing, and the inquiry may be made after making the user to confirm whether the inquiry about a service is to be made.

In step S1103, the CPU 401 determines whether the CPU 401 has received a response to the inquiry about an available service from the printing apparatus 200. If the CPU 401 determines that the mobile terminal 400 has received such a response (Yes in step S1103), the processing proceeds to step S1104. Meanwhile, if the CPU 401 determines that the mobile terminal 400 has not received such a response (No in step S1103), the CPU 401 waits until the mobile terminal 400 receives such a response.

In step S1104, the operation unit 405 of the mobile terminal 400 displays an available service based on the received response. If the mobile terminal 400 has received, from the printing apparatus 200, a response indicating that the print service and the storage service are available, the operation unit 405 displays the service selection screen 700 illustrated in FIG. 7A. Meanwhile, if the received response indicates that only the print service is available, the operation unit 405 displays the service selection screen 710 illustrated in FIG. 7B. Unlike the service selection screen 700, the storage service is not displayed on the service selection screen 710. In this manner, the operation unit 405 displays a screen based on a response received from the printing apparatus 200 such that the user can differentiate between an available service and an unavailable service.

The user can select a desired service from the services displayed in step S1104 and can use that service. When the user instructs the use of the desired service by selecting the service via the service selection screen 700 or the like, a service use request is transmitted to the printing apparatus 200, and the printing apparatus 200 in turn carries out the requested service.

As described thus far, according to the present exemplary embodiment, among the services provided by the printing apparatus 200, the user can set a service that is to be provided to the external device (i.e., a service available to the external device) and a service that is not to be provided to the external device (i.e., a service unavailable to the external device) while the external device is connected to the printing apparatus 200 via the Wi-Fi Direct®.

In addition, the printing apparatus 200 displays the reception screen for receiving an execution instruction from the user for carrying out the connection processing based on the Wi-Fi Direct® such that the user can differentiate between an available service and an unavailable service among the services provided by the printing apparatus 200. This configuration enables the user to recognize whether a desired service is available at a timing prior to actually carrying out the connection processing, and thus unnecessary connection processing is prevented from being carried out if the desired service is unavailable.

In the exemplary embodiment described above, as described with reference to the setting screen 600 illustrated in FIG. 6, the user sets whether each of the services provided by the printing apparatus 200 is or is not to be provided to an external device. In another embodiment, the printing apparatus 200 may determine whether to provide a service to an external device based on whether the printing apparatus 200 is capable of providing the service. For example, the printing apparatus 200 may determine not to provide the print service 306 to an external device if the printing apparatus 200 is out of toner or paper, or the printing apparatus 200 may determine not to provide the storage service 307 to an external device if free capacity in the storage area is below a predetermined size.

In addition, the printing apparatus 200 and the mobile terminal 400 carry out the Wi-Fi Direct® as wireless communication in the exemplary embodiment described above. However, the wireless communication is not limited to the Wi-Fi Direct®. The exemplary embodiment can be applied to any wireless communication that enables direct communication among a plurality of communication apparatuses, as with the Wi-Fi Direct®.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiment(s), a user can set a service to be provided to an external device from among a plurality of services.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-051619 filed Mar. 14, 2013, which is hereby incorporated by reference herein in its entirety.

What is claimed is:

1. A communication apparatus having a plurality of services, the communication apparatus comprising:
   a display unit configured to display a reception screen for receiving, from a user, an execution instruction for executing connection processing to establish wireless communication between an external device and the communication apparatus; and
   a connection unit configured to execute the connection processing if the execution instruction is received from the user via the reception screen, wherein the display unit displays the reception screen such that the user is able to differentiate between a service that is to be provided to the external device and a service that is not to be provided to the external device.

2. The communication apparatus according to claim 1, wherein the display unit displays the reception screen such that the user is able to recognize whether each of the plurality of services is or is not to be provided to the external device.

3. The communication apparatus according to claim 1, further comprising a control unit configured to perform control so that the connection processing is not executed if none of the plurality of services are to be provided to the external device.

4. The communication apparatus according to claim 1, wherein a receiving portion is displayed on the reception screen for receiving the execution instruction from the user, and
wherein the display unit displays the reception screen with the receiving portion being disabled if none of the plurality of services are to be provided to the external device.

5. The communication apparatus according to claim 1, wherein the connection processing is processing for determining roles of the external device and the communication apparatus in the wireless communication, and establishing the wireless communication based on the determined roles.

6. The communication apparatus according to claim 5, wherein either a group owner or a client is determined as the role in the wireless communication.

7. The communication apparatus according to claim 1, further comprising:
a setting unit configured to set a service that is to be provided to the external device from among the plurality of services,
wherein the display unit displays the reception screen such that the user is able to differentiate between the service that is to be provided to the external device and the service that is not to be provided to the external device, based on a setting by the setting unit.

8. The communication apparatus according to claim 1, wherein the plurality of services includes a print service.

9. The communication apparatus according to claim 8, wherein if the communication apparatus is out of toner, the print service is displayed in the reception screen as the service that is not to be provided to the external device.

10. The communication apparatus according to claim 1, wherein the plurality of services includes a storage service.

11. The communication apparatus according to claim 10, wherein if free capacity in a storage area is below a predetermined size, the storage service is displayed in the reception screen as the service that is not to be provided to the external device.

12. A method for controlling a communication apparatus having a plurality of services, the method comprising:
displaying a reception screen for receiving, from a user, an execution instruction executing connection processing to establish wireless communication between an external device and the communication apparatus;
executing the connection processing if the execution instruction is received from the user via the reception screen; and
displaying the reception screen such that the user is able to differentiate between a service that is to be provided to the external device and a service that is not to be provided to the external device.

13. A non-transitory computer-readable medium storing computer-executable instructions that cause a computer to execute a method for controlling a communication apparatus having a plurality of services, the method comprising:
displaying a reception screen for receiving, from a user, an execution instruction for executing connection processing to establish wireless communication between an external device and the communication apparatus;
executing the connection processing if the execution instruction is received from the user via the reception screen; and
displaying the reception screen such that the user is able to differentiate between a service that is to be provided to the external device and a service that is not to be provided to the external device.

14. A communication apparatus having a plurality of services, the communication apparatus comprising:
a display unit configured to display a reception screen for receiving, from a user, an execution instruction for executing connection processing to establish wireless communication between an external device and the communication apparatus; and
a connection unit configured to execute the connection processing if the execution instruction is received from the user via the reception screen,
wherein the display unit displays a service that is to be provided to the external device in the reception screen, and does not display a service that is not to be provided to the external device in the reception screen.

15. The communication apparatus according to claim 14, further comprising:
a setting unit configured to set the service that is to be provided to the external device from among the plurality of services,
wherein the display unit displays in the reception screen the service that is to be provided to the external device, and does not display in the reception screen the service that is not to be provided to the external device, based on a setting by the setting unit.

16. The communication apparatus according to claim 14, wherein the plurality of services includes a print service.

17. The communication apparatus according to claim 16, wherein if the communication apparatus is out of toner, the display unit does not display the print service in the reception screen.

18. The communication apparatus according to claim 14, wherein the plurality of services includes a storage service.

19. The communication apparatus according to claim 18, wherein if free capacity in a storage area is below a predetermined size, the display unit does not display the storage service in the reception screen.

20. The communication apparatus according to claim 14, further comprising a control unit configured to perform control so that the connection processing is not executed if none of the plurality of services are to be provided to the external device.

21. A method comprising:
displaying a reception screen for receiving, from a user, an execution instruction for executing connection processing to establish wireless communication between an external device and a communication apparatus;
executing the connection processing if the execution instruction is received from the user via the reception screen; and
displaying a service that is to be provided to the external device in the reception screen, and not displaying a service that is not to be provided to the external device in the reception screen.

22. One or more non-transitory computer-readable media storing instructions that, when executed by one or more computing devices, cause the computing devices to perform operations comprising:
- displaying a reception screen for receiving, from a user, an execution instruction for executing connection processing to establish wireless communication between an external device and a communication apparatus;
- executing the connection processing if the execution instruction is received from the user via the reception screen; and
- displaying a service that is to be provided to the external device in the reception screen, and not displaying a service that is not to be provided to the external device in the reception screen.

* * * * *